United States Patent
Haimer

(10) Patent No.: US 10,618,117 B2
(45) Date of Patent: Apr. 14, 2020

(54) CHUCK WITH VIBRATION DAMPING

(71) Applicant: Franz Haimer Maschinenbau KG, Hollenbach-Igenhausen (DE)

(72) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 0 days.

(21) Appl. No.: 15/826,570

(22) Filed: Nov. 29, 2017

(65) Prior Publication Data

US 2018/0079011 A1 Mar. 22, 2018

Related U.S. Application Data

(63) Continuation of application No. 14/766,096, filed as application No. PCT/EP2014/052090 on Feb. 4, 2014, now Pat. No. 9,862,032.

(30) Foreign Application Priority Data

Feb. 5, 2013 (DE) .................. 10 2013 001 907
Feb. 25, 2013 (DE) .................. 10 2013 101 854

(51) Int. Cl.
```
B23B 31/10      (2006.01)
B23B 31/117     (2006.01)
B23B 31/02      (2006.01)
B23Q 11/00      (2006.01)
B23B 29/02      (2006.01)
B23B 27/00      (2006.01)
B23C 5/00       (2006.01)
```

(52) U.S. Cl.
CPC ............ *B23B 31/117* (2013.01); *B23B 31/02* (2013.01); *B23B 31/1179* (2013.01); *B23Q 11/0032* (2013.01); *B23B 27/002* (2013.01); *B23B 29/022* (2013.01); *B23B 2226/33* (2013.01); *B23B 2250/16* (2013.01); *B23B 2251/70* (2013.01); *B23C 5/003* (2013.01)

(58) Field of Classification Search
CPC ..... B23C 5/003; B23B 29/022; B23B 27/002; B23B 2250/16; B23B 2251/70; B23B 2240/21; B23B 2240/32; B23B 31/117; B23B 31/1179; B23B 2240/28; B32Q 11/0035; B23P 11/027
See application file for complete search history.

(56) References Cited

U.S. PATENT DOCUMENTS 2,829,899 A 4/1958 Drew et al.
3,242,791 A 3/1966 Smith
(Continued)

FOREIGN PATENT DOCUMENTS

DE 102004019869 A1 8/2005
DE 102004024745 A1 12/2005
(Continued)

*Primary Examiner* — Alan Snyder
*Assistant Examiner* — Yasir A Diab

(57) ABSTRACT

A tool chuck for clamping a tool in a machine tool, having a base body and a sleeve part protruding therefrom, which sleeve part forms a tool holder for fixing a tool shaft in a frictional, nonpositive fashion; a cavity in which a vibration damping component is accommodated is provided in the tool chuck.

13 Claims, 6 Drawing Sheets

(56) References Cited

U.S. PATENT DOCUMENTS

| | | | |
|---|---|---|---|
| 4,251,113 A | * | 2/1981 | Mitin .................. B23B 31/08 173/131 |
| 5,311,654 A | | 5/1994 | Cook |
| 5,413,318 A | | 5/1995 | Andreassen |
| 7,028,997 B2 | | 4/2006 | Takahashi et al. |
| 8,128,101 B2 | | 3/2012 | Retzbach et al. |
| 2001/0056013 A1 | | 12/2001 | Cook |
| 2003/0147712 A1 | | 8/2003 | Kai et al. |
| 2004/0051257 A1 | | 3/2004 | Rall |
| 2008/0260483 A1 | | 10/2008 | Cook |
| 2009/0003947 A1 | | 1/2009 | Haimer et al. |
| 2009/0257838 A1 | | 10/2009 | Ostermann et al. |
| 2011/0318127 A1 | | 12/2011 | Freyermuth et al. |
| 2012/0099940 A1 | | 4/2012 | de Souza Filho |
| 2012/0207560 A1 | | 8/2012 | Sakamaki et al. |

FOREIGN PATENT DOCUMENTS

| | | |
|---|---|---|
| DE | 102004054550 A1 | 5/2006 |
| DE | 102005043626 A1 | 3/2007 |
| DE | 102011114958 A1 | 4/2012 |
| WO | 2009022712 A1 | 2/2009 |

\* cited by examiner

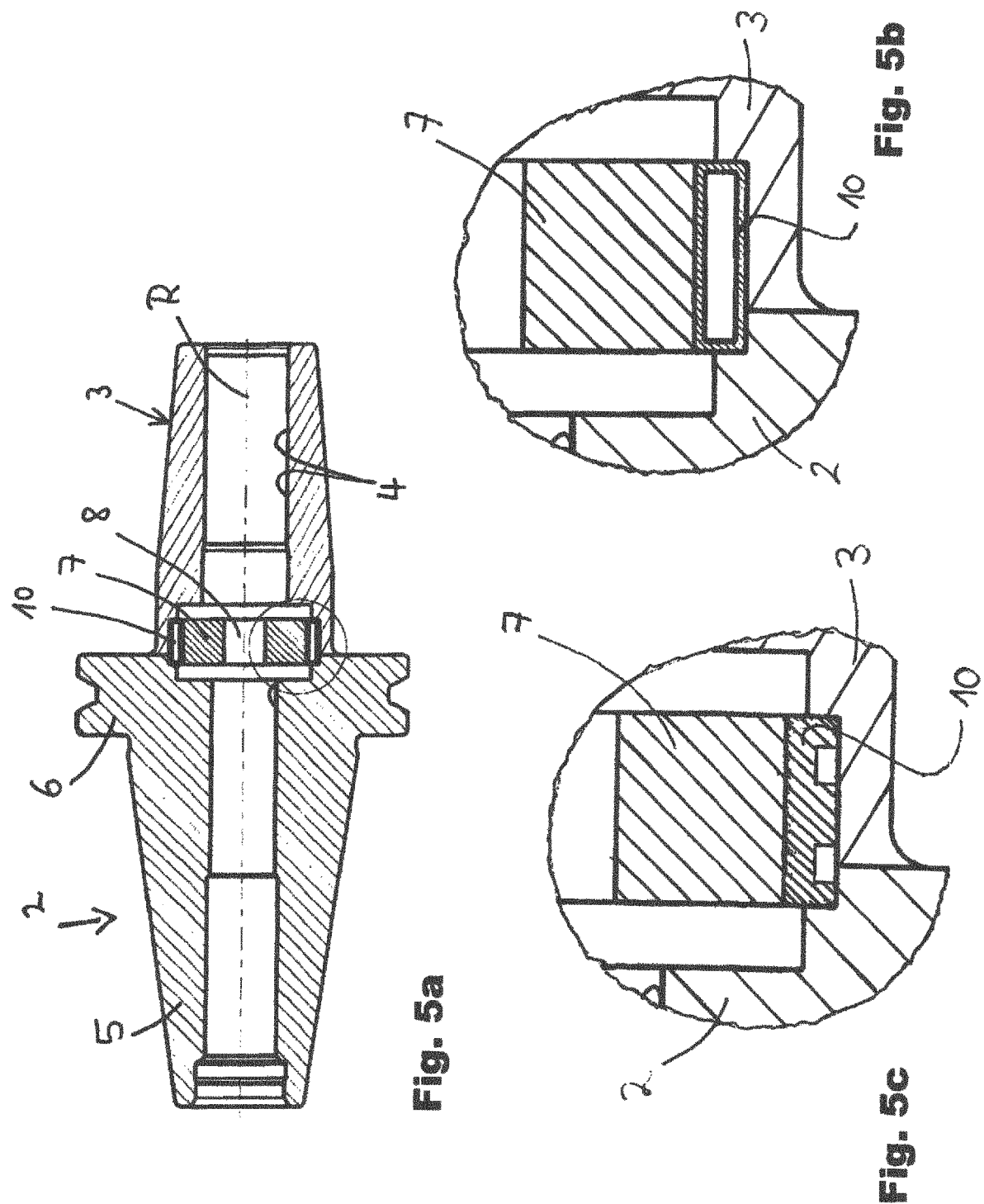

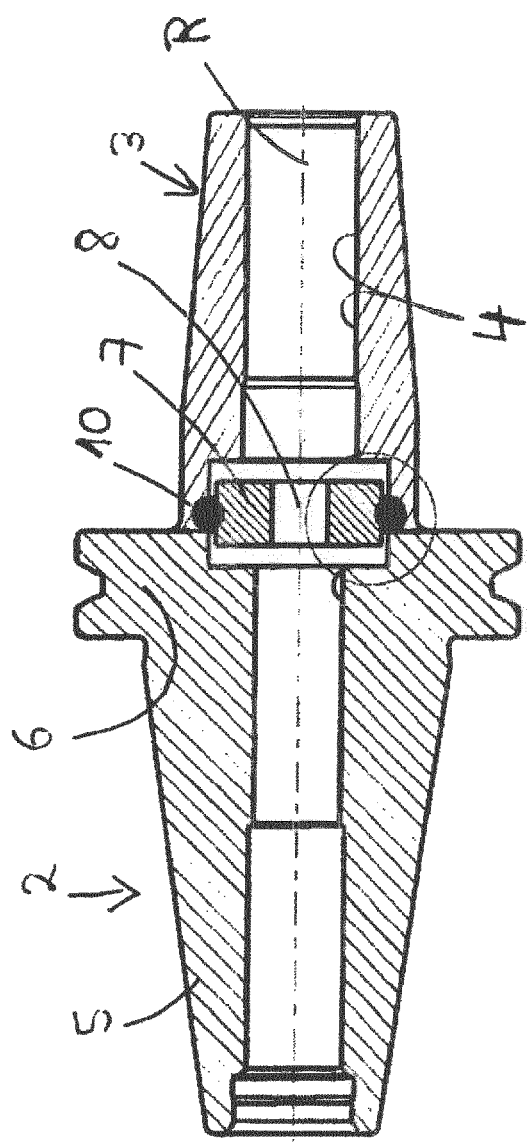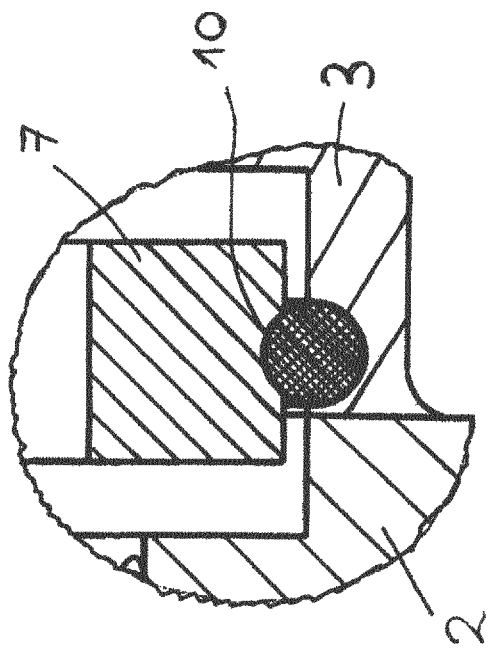

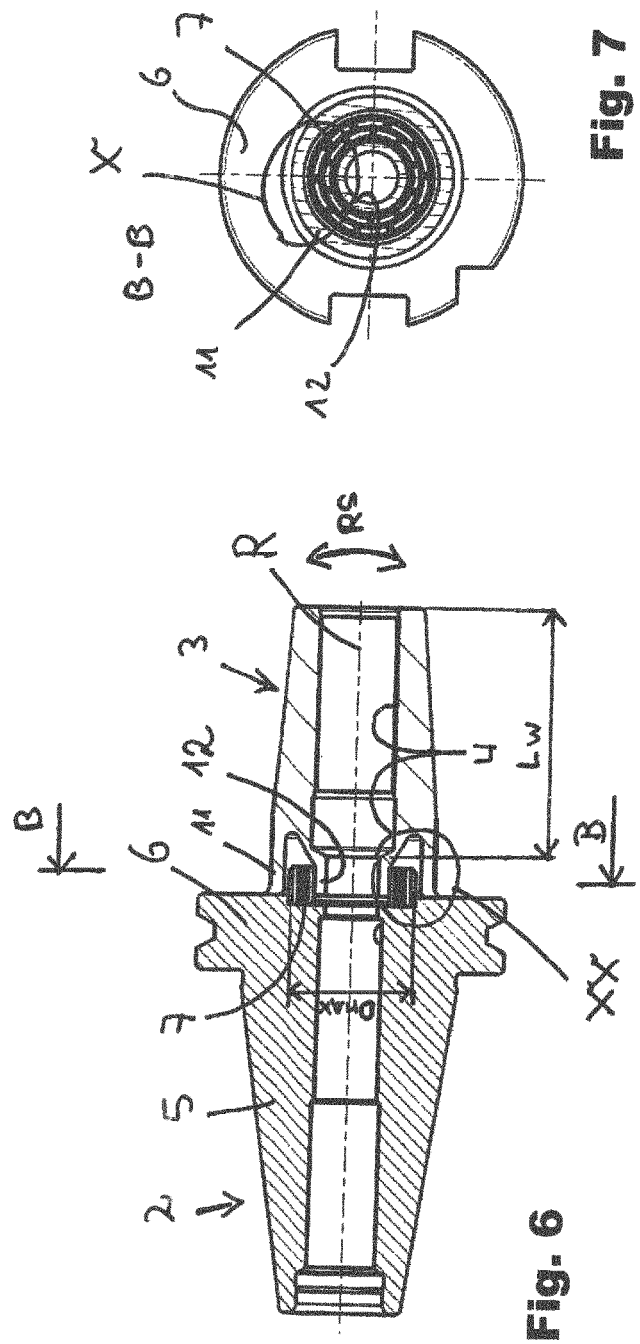
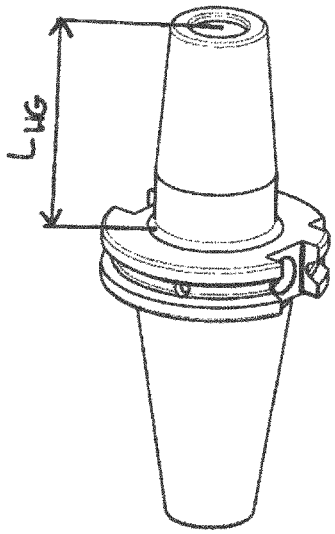
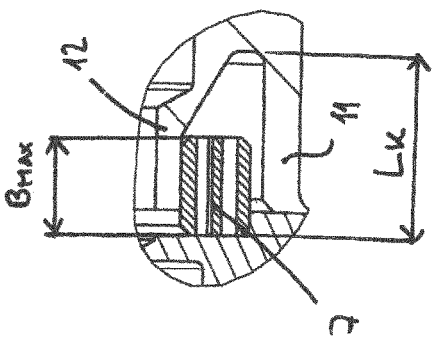
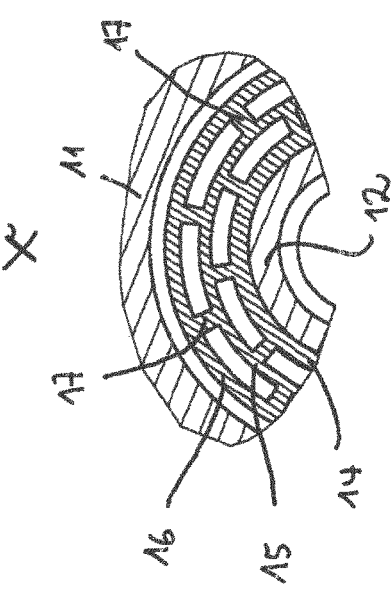

CHUCK WITH VIBRATION DAMPING

FIELD OF THE INVENTION

The invention relates to a tool chuck for a tool that rotates around an axis of rotation during operation, in particular a drilling, milling, reaming, or grinding tool. The tool chuck can be composed of one or more parts. Typically, at its end normally oriented toward the machine tool, it has a coupling section for coupling to the machine tool and at its end oriented away from the machine tool, it has a sleeve part for chucking a tool shaft.

BACKGROUND OF THE INVENTION

Not least when such tool chucks are used to hold tools in the form of milling cutters that rotate at a high speed in which the number of cutting edges currently in contact with the material to be machined fluctuates constantly by nature, the problem, arises that the sleeve part of such tool chucks is excited into executing undesirable vibrations.

In particular, bending vibrations occur in the sleeve part due to the bending of the sleeve part around a bending axis essentially perpendicular to the axis of rotation. Sometimes torsional vibrations also occur due to a resilient flexing of the sleeve part around its axis of rotation. In practice, mixed forms of these vibrations also occur, but often the radial portion predominates. Any vibrations potentially limit the machining precision that can be achieved with the tool. It is not unusual for such vibrations to also have a negative impact on the service life of tool cutting edges.

In the prior art, there has been no shortage of attempts to design tool chucks with a reduced tendency to vibrate by providing the tool chuck with integrated, long mass elements whose mass or natural vibration behavior improved the vibration behavior of the tool chuck as a whole. But since the prior assumption was that the mass elements can only be sufficiently effective if they have a substantial dimension in the direction of the axis of rotation, the previously known vibration-damped tool chucks are distinguished by the fact that they have a substantial overall length. This is cumbersome for a not insignificant number of applications.

By contrast, the object of the invention is to provide compact tool chucks that have only a reduced tendency to vibrate.

SUMMARY OF THE INVENTION

Consequently, what is described herein is a tool chuck for clamping a tool in a machine tool, having a base body and a sleeve part protruding therefrom, which sleeve part forms a tool holder for fixing a tool shaft in a frictional, nonpositive fashion. In this case, a cavity is provided in the tool chuck, in which a vibration-damping component is situated, which is preferably an additional component that is embodied as separate from the base body and the sleeve part.

Preferably, the cavity begins in the vicinity of the transition from the base body to the sleeve part and extends from there along the axis of rotation in the direction toward the tool holder.

Ideally, the cavity has a length along the axis of rotation that is less than $2/5$ and preferably less than $1/5$ the length of the tool holder in this direction. Contrary to what was taught in the prior art, the lengths—in the direction of the axis of rotation—of the cavity and of the vibration-reducing component contained therein are kept short. At the same time, the cavity and therefore also the spatial localization of the vibration-reducing component contained therein are concentrated on the vicinity of the transition from the base body into the sleeve part.

This particular embodiment departs from the previous concept of positioning the vibration-reducing component also in a region remote from the transition between the base body and the sleeve part and giving it a substantial length and thus a considerable mass in order to thus produce the best possible effect. Surprisingly, it has turned out here that even a vibration-reducing component that is embodied as relatively delicate—as long as it is positioned in the vicinity of the transition from the base body to the sleeve part—produces a considerable effect, which was not expected.

This is particularly true when the sleeve part is embodied very compactly in the direction of the axis of rotation in that the length of the sleeve part is essentially limited to the length of the tool holder (including its outlet, which serves to adjust the length of the tool and which is included under the term "tool holder" in this description). This is the case when the length of the tool holder makes up more than $3/4$—and better still more than $4/5$—of the overall length of the sleeve part.

In this connection, it has turned out to be particularly effective to position the cavity so that it directly adjoins the region of the change in diameter at which the sleeve part transitions into the base body or even so that it lies within this region along with the vibration-reducing component that is inserted into it so that the change in diameter—viewed in the direction of the axis of rotation—occurs at the level of the circumference wall that delimits the cavity.

Advantageously, the cavity does not, extend all the way through the securing flange and therefore does not reach into the coupling section.

Advantageously, the cavity is encompassed in the circumference direction by a joint between the base body and the sleeve part, which is preferably embodied in the form of a welded seam. The base body and the sleeve part are thus welded together in a region that constitutes the circumferential boundary of said cavity. Alternatively, a glue joint can also be provided, but a weld is preferable.

In a preferred embodiment, the vibration-reducing component is embodied as a disc and in particular as an annular disc with a central opening. Such a central opening is used as a passage for the conduit that extends through the tool chuck, via which the tool can be supplied with cooling lubricant. Advantageously, the maximum dimension $B_{max}$ of the disc parallel to the axis of rotation is less than the maximum diameter $D_{max}$ of the disc, preferably in accordance with the equation $B_{max}/D_{max} \leq 2$ and ideally, in accordance with the equation $B_{max}/D_{max} \leq 3$.

Preferably, the disc is composed of metal, in particular a heavy metal or a metal and in particular, a material that contains heavy metal. In the context of the invention, a "heavy metal" is understood to mean any metal that has a specific weight that is at least 10% higher than that of unalloyed steel. Copper is a heavy metal that is predestined for use in the context of the invention. Copper is available for a reasonable price, easy to handle, and when used in the manner according to the invention, has noticeably better damping properties than steel. Tungsten, for example, is also very suitable because of its extremely high weight; it is also possible to use lead.

It has also turned out to be a very advantageous alternative to produce the disc out of a metal alloy with a particularly powerful vibration damping action, as is currently offered by the company Les Bronzes d'Industrie: 26 rue de la République, 57360 Amnéville, France under the brand name EXTUIM® AM.

An advantageous modification of the invention is comprised in that the disc rests with at least one of its circumference surfaces directly against a corresponding circumference surface of the sleeve part and/or base body. As a result, it is very easy to keep the disc in a central position relative to the axis of rotation, while it acts on the base body and the sleeve part primarily with its end faces so that a reduction in undesirable vibrations occurs.

The action of the disc can be limited to the fact that solely due to its mass, it exerts a positive influence on the vibration behavior of the sleeve part.

Preferably, the disc is employed to subject the sleeve part to a prestressing force acting in the direction of the axis of rotation. For this purpose, the maximum dimension $B_{max}$ of the disc is selected so that the end faces of the sleeve part and base body do not rest against each other when these two parts are assembled with the disc interposed between them. Then the assembly is compressed with a press so that the end faces of the sleeve part and base body come closer to each other through an elastic deformation of the disc, whereupon they are welded to one another. The elastically compressed disc produces a permanent prestressing force in the sleeve part, which exerts a positive influence on its vibration behavior.

An advantageous modification of the invention to be used as an alternative is comprised in the fact that the disc rests with a circumference surface via an intermediate layer composed of plastic and/or elastomer against a corresponding circumference surface of the sleeve part and/or base body such that with proper operation, the disc is able to execute relative movements in the radial direction in relation to the sleeve part and the base body. In this way, the disc can in turn be excited to execute vibrations in the radial direction that overlap with the undesirable vibrations executed by the sleeve part. Preferably, the disc in this case, with its end faces between corresponding end faces of the sleeve part and the base body, is either not clamped or not clamped so powerfully as to produce a significant restriction of its mobility in the radial direction. Instead, the disc can be excited to execute vibrations in the radial direction. These vibrations overlap with the vibrations of the sleeve part, thus advantageously influencing the vibration behavior of the sleeve part because an at least partial cancellation of the undesirable vibrations of the sleeve part occurs. The disc functions as a vibration damper, so to speak.

In another preferred embodiment, the vibration-reducing component is held inside the tool chuck and equipped in such a way that it is intrinsically excited to execute vibrations during operation—so that during operation, a part of the spring element that protrudes freely into the cavity of the tool chuck begins to vibrate relative to the part of the spring element that is fastened to the tool chuck. In this way as well, vibrations of the vibration-reducing component can be produced, which in turn overlap with the undesirable vibrations of the sleeve part so that the latter are at least partially canceled out. This design is therefore another variant of a vibration damper.

In order to implement the above-described vibration damper, it is particularly advantageous if the sleeve part, on its end face oriented toward the base body, has a first annular flange for connection to the base body and a second flange situated concentrically inside the first annular flange that does not come into contact with the base body even in the completely assembled state. A section of the spring element is affixed to the latter flange, while a section of the spring element oriented away from the fastening point extends into the cavity of the tool chuck as a result of which, this section of the spring element opposite from the part of the spring section that is affixed to the sleeve part can be excited to execute vibrations.

The vibration-reducing component can be embodied so that the preponderance of its spring deflection that is used according to the invention is not produced by the elasticity that is also inherent in any element composed of solid material, but rather by the spatial embodiment of the spring element that achieves a significant enlargement of the spring deflection as compared to that of a corresponding solid element.

Advantageously, the spring element is composed of at least two, ideally at least three, rings situated one inside the other, that are connected to one another by means of bridge pieces that extend essentially in the radial direction in this exemplary embodiment.

Through the design of the spring element, it is possible to exert a substantial influence on the natural vibration behavior and therefore damping behavior of the spring element.

In an alternative embodiment, the base body and the sleeve pan are assembled with frictional, nonpositive engagement not directly, but with the interposition of a material layer that provides a damping action and constitutes the connection between the base body and the sleeve part. This has an advantageous effect on the vibration behavior of the sleeve part and the vibrations of the sleeve part are transmitted not unhindered to the spindle of the machine tool.

The gap, which is situated between the sleeve part and base and is filled with the damping material layer, is preferably embodied as wedge-shaped or conical so that the sleeve part and base body are pressed into each other in a centering fashion by compressive forces acting in the direction of the axis of rotation.

For this embodiment, it is particularly advantageous to equip the end faces of the sleeve part and/or base body oriented toward the gap with undercuts into which the damping material layer can penetrate in order to produce a form-fitting engagement. This provides for a particularly secure anchoring of the damping material layer to the base body and/or the sleeve part.

In lieu of actual undercuts, it is also optionally possible to merely provide a profiling of the corresponding end face.

Other potential embodiments, modes of operation, and advantages of the invention ensue from the following description of the various exemplary embodiments of the invention in conjunction with the drawings.

BRIEF DESCRIPTION OF THE DRAWINGS

FIG. 5a shows a first variant of the exemplary embodiment described in connection with FIGS. 3 through 5.

FIG. 5b shows an enlarged detail from FIG. 5a.

FIG. 5c shows a possible modification of the first variant shown in FIG. 5a and 5b.

FIG. 5d shows a second variant of the exemplary embodiment described in connection with FIGS. 3 through 5.

FIG. 5e shows an enlarged detail from FIG. 5c.

FIG. 6 shows a tool chuck of a third exemplary embodiment of the invention in a sectional view along the axis of rotation R.

FIG. 7 shows the third exemplary embodiment according to FIG. 6 in a sectional view along the section line B-B.

FIG. 8a shows an enlarged detail of the region labeled with the letter X in FIG. 7.

FIG. 8b shows an enlarged detail of the region labeled with the letters XX in FIG. 6.

FIG. 9 shows a perspective side view of the tool chuck shown in FIGS. 6 through 8.

DETAILED DESCRIPTION OF TEE PREFERRED EMBODIMENTS

Figure 1:
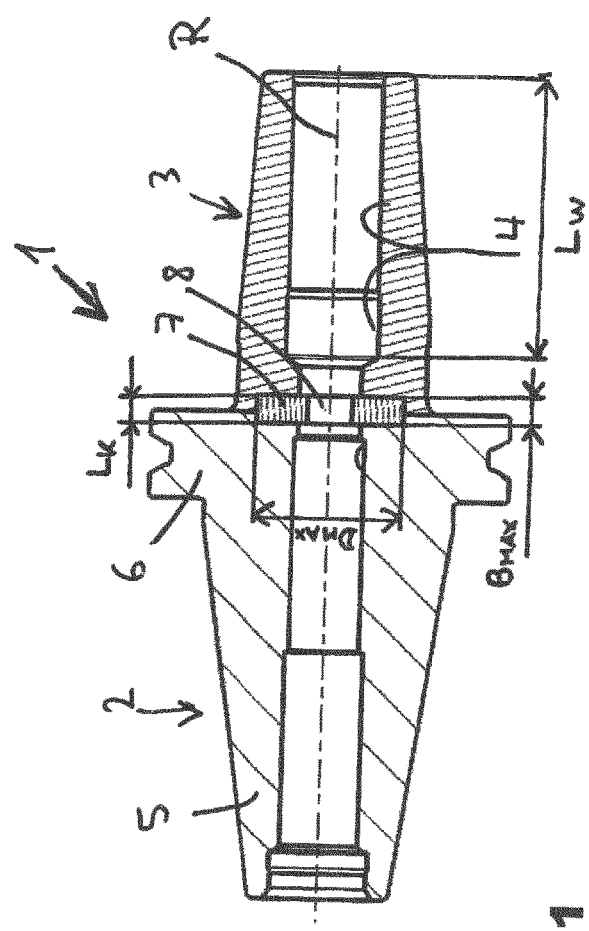
FIG. 1 shows a tool chuck of a first exemplary embodiment of the invention in a sectional view along the axis of rotation R.
Figure 2:
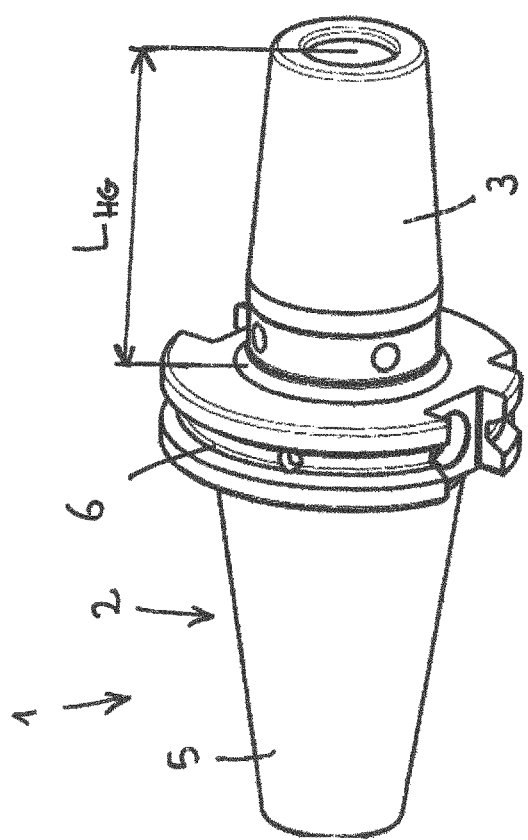
FIG. 2 shows a perspective side view of the tool chuck shown in FIG. 1.

FIG. 1 shows an entire tool chuck 1 according to the first exemplary embodiment. This tool chuck 1 is composed of a base body 2 and a sleeve part 3 protruding therefrom. A tool holder 4 is embodied inside the sleeve part 3.

In this case, the tool chuck is embodied as a so-called shrink fit chuck. The inner diameter of the tool holder 4 embodied in the sleeve part 3 is somewhat smaller than the outer diameter of the tool shaft, not shown, so that the sleeve part 3 holds the tool shaft firmly in a snug fit once the sleeve part 3 has cooled again after insertion of the tool shaft. Because of the details it contains relating to this, reference is hereby made to the applicant's European Patent EP 1 804 900, the full content of which is incorporated by reference into the present description.

The use of the invention is particularly advantageous for so-called shrink fit chucks that are usually composed of a solid sleeve part 3 that does not have any significant discontinuities. It should be stated at the outset, though, that the protection claimed for the invention is not restricted to chucks of this kind, but can instead also be used, for example, for chucks of the Weldon type, whistle-notch type, or collet type.

As is clearly evident from FIG. 1, the base body 2 has a coupling section 5. This section is used to couple the unit, which is composed of the tool chuck 1 and the tool it holds, to a machine tool. The coupling section 5 in this case is embodied in the form of a steeply conical coupling shaft, which is advantageous, but the protection is not limited to this, also see the other exemplary embodiments shown in the figures, some of which show a hollow shaft coupling (HSK coupling). The coupling shaft therefore makes no contribution as such to the production of vibrations since it behaves in an extraordinarily rigid fashion not least because it is clamped into the spindle of the machine tool.

Furthermore, the base body 2 generally has a securing flange 6 to which a handling system, regardless of its embodiment, can be attached in order to permit handling of the tool chuck 1 during the automatic tool change. Because of its large diameter, the securing flange itself does not tend to contribute to the production of vibrations.

After the securing flange 6, the base body 2 usually transitions into the sleeve part 3 with a change in diameter.

As shown in FIG. 1, a cavity begins in the vicinity of this transition between the base body 2 and the sleeve part 3 and extends in the direction of the axis of rotation R to the tool holder 4. The cavity in this case can protrude a certain distance farther into the region of the securing flange 6, but does not reach into the coupling section 5. The maximum diameter of the cavity is greater than the maximum diameter of the tool holder or the conduit for supplying the tool with cooling lubricant. This cavity, which is jointly formed by the base body 2 and the sleeve part 3, encloses a vibration-reducing component 7, which in this case is embodied as a separate component. The cavity is embodied as conspicuously short in the direction of the axis of rotation R; in this case, its length $L_K$ is less than ⅑ the length $L_W$ of the tool holder. The vibration-reducing component 7 essentially fills the cavity completely so that the same is true for the length of the vibration-reducing component viewed in the direction of the axis of rotation.

FIG. 1 also makes it very apparent that the overall length $L_{HG}$ of the sleeve part is kept to the absolute minimum. The length $L_W$ of the tool holder embodied in the sleeve part makes up more than ⅘ of the overall length $L_{HG}$ of the sleeve part.

The vibration-reducing component 7 in this case is embodied as a ring made of heavy metal and/or as a ring made of a metal with a particularly powerful vibration damping action, as is currently offered by the company Les Bronzes d'Industrie, 26 rue de la République, 57360 Amnéville, France under the brand name EXIUM® AM.

FIG. 1 clearly shows that the maximum dimension $B_{max}$ of the annular disc or ring parallel to the axis of rotation is less than the maximum diameter $D_{max}$ of the ring by a factor of more than 4. In the region of its center, this ring has an opening 8 that contributes to the creation of a conduit extending through the base body 2 and sleeve part 3 and reaching into the region of the tool holder 4, via which a supply of coolant, for example, can be provided. If such a conduit is not needed, then the ring can also be embodied as a solid disc, which is not shown in the drawings.

The ring is placed in the cavity without the insertion of an elastic intermediate layer. On its outer circumference, it rests directly against the inner circumference of the sleeve part 3 and/or base body 2 and is held in a centered position in relation to the axis of rotation R. In this case, the cavity containing the ring is dimensioned so that the end faces of the ring rest with a particular prestressing force against the corresponding end faces of the cavity the ring is held in the cavity in clamped fashion and thus imparts a prestressing force to at least some regions of the sleeve part 3, which exerts a positive effect on the vibration behavior of the sleeve part.

The above-mentioned prestressing force, however, is not the only effect that can be taken advantage of when using such a ring.

On the contrary, the vibration-reducing component 7 in the form of the ring can also or instead exert a positive influence in that in the course of the radial vibrations or "walking" movement of the rotating sleeve part 3, the ring is compressed and at least partially released again in quick succession and thus produces a damping effect. Not least with regard to this effect, it can be advantageous to provide the ring with one or more local slots (not shown in the drawings) that promote this effect.

In the exemplary embodiment shown here, the base body 2 and the sleeve part 3 originally constituted two separate components, which have been welded to each other in a subsequent step—but this is not the only manufacturing option; see below for more details.

If this advantageous manufacturing option is selected, then it is advantageous that each of these components, in its imaginary end face for contacting the respective other component, has a turned groove so that these two components, once they are connected by the welded seam 9, combine to form the intrinsically closed cavity, which accommodates the vibration-reducing component 7 in the form of a ring. The interstice between the base body 2 and the sleeve part 3, which may possibly have disappeared as a result of the subsequent welding, therefore spans a plane that touches or intersects the cavity. As a result, the vibration-reducing component 7 is situated precisely at the transition between the base body 2 and the sleeve pan 3. In this case, the prestressing force with which the vibration-reducing component 7 rests with its end faces against the corresponding end faces of the base body 2 and sleeve pan 3 can be conveniently set by pressing the base body 2 and sleeve part 3 against each other with corresponding force as they are being welded. Naturally, through an appropriate selection of the welding parameters, care is taken to prevent the root of the molten mass from directly reaching the vibration-reducing component 7 during the welding because the melting of the vibration-reducing component 7 could reduce the quality of the welded seam.

For the sake of completeness, it should be noted that the exemplary embodiment can also be modified in that only the sleeve pan 3 or only the base body 2 has a turned groove or an arbitrarily produced recess that serves to (almost completely) accommodate the vibration-reducing component 7 in the form of a ring.

As indicated above, the welding of a separately produced base body 2 to a sleeve pan 3 is not the only way to produce a tool holder according to the invention. Instead, modern technologies such as laser sintering make it possible to produce the tool holder in one piece and thus to enclose the vibration-reducing component 7, which in this case is also produced from a different material, in the position shown in FIG. 1 for the welded design.

Figure 4:
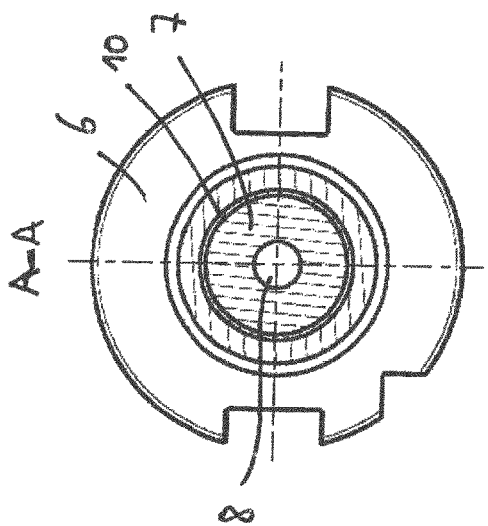
FIG. 4 shows a section through the tool chuck shown in FIG. 3 along the section line A-A.
Figure 3:
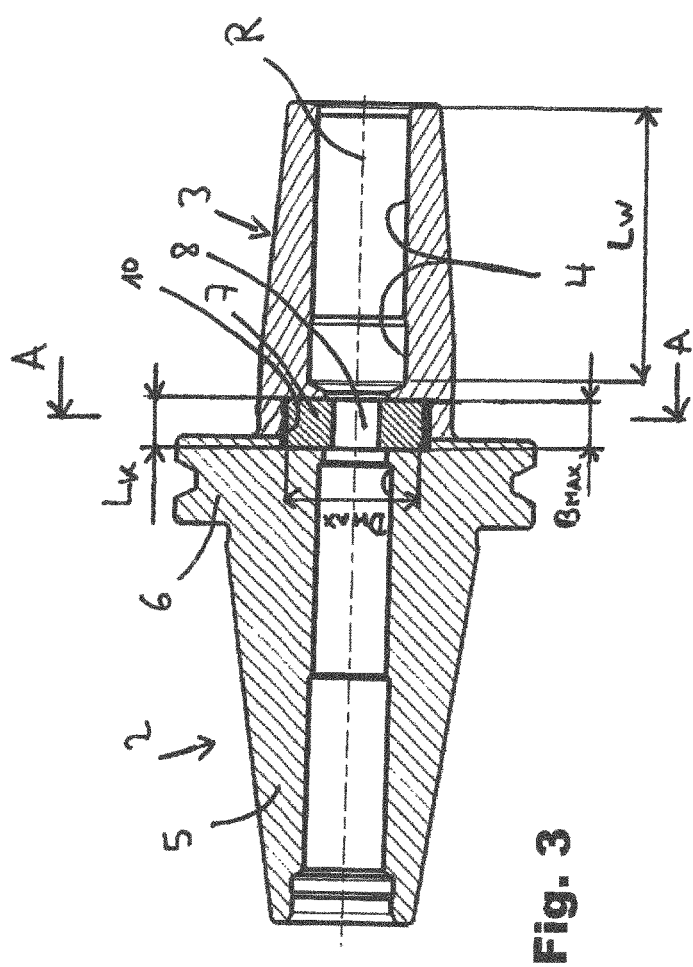
FIG. 3 shows a tool chuck of a second exemplary embodiment of the invention in a sectional view along the axis of rotation R.
Figure 5:
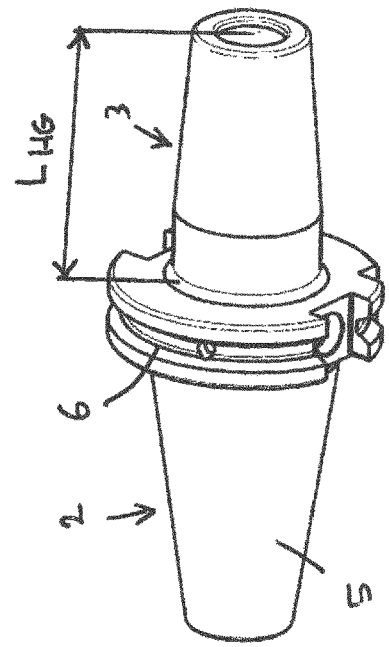
FIG. 5 shows a perspective side view of the tool chuck shown in FIGS. 3 and 4.

FIGS. 3 through 5 show a second exemplary embodiment of the invention.

Statements made above with regard to the first exemplary embodiment also apply correspondingly to this exemplary embodiment because the two exemplary embodiments are identical with the exception of the differences described below.

As shown in FIG. 3, in this exemplary embodiment as well, a cavity begins in the vicinity of this transition between the base body 2 and the sleeve part 3; this cavity extends in the direction of the axis of rotation R to the tool holder 4 and protrudes a certain distance farther into the region of the securing flange 6, but does not reach into the coupling section 5.

Here, too, the maximum diameter of the cavity is greater than the maximum diameter of the tool holder or of the conduit for supplying the tool with cooling lubricant.

This cavity, which is jointly formed by the base body 2 and the sleeve part 3, once again encloses an additional vibration-reducing component 7.

In this exemplary embodiment as well, the cavity is embodied as conspicuously short in the direction of the longitudinal axis; its length $L_K$ here is less than ⅕ the length $L_W$ of the tool holder. The vibration-reducing component 7 essentially fills the cavity completely so that the same is true for the length of the vibration-reducing component viewed in the direction of the axis of rotation.

In this exemplary embodiment as well, the vibration-reducing component 7 is composed of a ring, which is preferably composed of a heavy metal and/or the particularly vibration-damping metal mentioned above.

Unlike in the first exemplary embodiment, however, this ring does not rest with its circumference surface directly against a corresponding circumference surface of the sleeve part 3 and or the base body 2. Instead, between the circumference surface of the ring and the corresponding circumference surface of the sleeve part 3 and/or base body 2, there is a layer that is referred to here as the elastic layer 10 and is composed of a preferably flexible plastic or an elastomer material. The layer is preferably embodied as annular and ideally, is kept quite thin, with a thickness of only 0.5 mm to 3 mm measured in the radial direction. The purpose of the layer is to permit the ring to move in the radial direction; in the material selection and positioning of the above-mentioned elastic material, care is taken to make sure not to impede its elasticity or compressibility, for example through the inadvertent occurrence of a disadvantageous hydrostatic stress state in the elastic material.

Preferably, the end faces of the ring are not provided with a layer of the above-mentioned flexible plastic or elastomer material. In this exemplary embodiment, the end faces of the ring either do not rest directly against the corresponding end faces of the base body 2 and the sleeve part 3 or do not rest against them with a perceptible prestressing force or rest against them with less than a limited prestressing force, which ensures that the ring can move in the radial direction, producing corresponding, friction forces that can likewise have a damping effect.

In a design of this kind, the ring tends to act as a vibration damper relative to the radial vibrations occurring in the sleeve part 3, in other words, the ring has the tendency to execute counter-vibrations that at least partially interfere with the radial vibrations occurring in the sleeve part 3 and thus at least reduce the undesirable radial vibrations of the sleeve part 3.

If the ring is to act as a vibration damper of this kind, then its mass must not be too low. Because of this, in this second exemplary embodiment, the ring, as can be seen quite well by comparing FIGS. 3 and 1, is preferably embodied as wider in the direction of the axis of rotation of the tool chuck than the corresponding ring in the first exemplary embodiment. FIG. 3 clearly shows that the maximum dimension $B_{max}$ of the annular disc or ring parallel to the axis of rotation is, however, still smaller than the maximum diameter of the ring by a factor of more than 2.5.

FIGS. 5a and 5b show a first variant of the above-explained second exemplary embodiment; all of the statements made above in connection with the second exemplary embodiment apply here as well, provided that nothing to the contrary is stated in the following explanation of the things that have been modified.

In this case, ins both the radial direction and the direction of the axis of rotation R, the cavity is embodied as larger than the vibration-reducing component 7 that it accommodates, which in this case is embodied in the form of a ring that tends to act as a vibration damper. Because of this, there is no contact anywhere between the ring and the boundary walls of the cavity.

Between the circumference surface of the ring and the corresponding circumference surface of the sleeve part 3 and/or base body 2, there is a layer that in this case is also referred to as the elastic layer 10. Via this layer, the circumference of the ring indirectly contacts the inner circumference of the cavity, while the end faces of the ring preferably have complete freedom of motion and, in the neutral position, are preferably spaced apart from the end-face boundary walls of the cavity by a distance of at least 5/10 mm or, better still, by a distance of at least 10/10 mm.

The above-mentioned layer is preferably embodied so that in its neutral position, the ring, even on its outer circumference, maintains a distance of at least 5/10 mm and ideally at most 4/10 mm from the circumference wall of the cavity since otherwise, it does not have enough freedom to execute the required vibrations or its tendency to vibrate becomes too high.

The purpose of this layer is to permit a more than merely insignificant movement of the ring in an essentially radial direction and it is embodied accordingly.

This layer is preferably comprised of an annular element that is hollow on the inside and is therefore correspondingly compressible in the radial direction, see FIG. 5b. An element that is hollow on the inside and is preferably closed in the circumference direction is ideal, but this is not the only conceivable embodiment. Instead, for example, it is also possible to use an element that is preferably closed in the circumference direction and has one or more local recesses on the inside and/or on the outer circumference that produce, a corresponding compressibility, see FIG. 5c. Finally, as a further alternative, it is conceivable to use an element that will provide the necessary compressibility and flexibility in the radial direction by being comprised of a foamed material.

Preferably, the above-mentioned annular element is affixed to the ring provided as a vibration damper so as to hold it in a defined position in the neutral state. To this end, the annular element is either locked to the ring in a form-fitting, detent fashion and/or preferably glued to the ring or is vulcanized and/or injection molded onto it. Ideally, the ring has form-fitting elements in the form of undercuts or raised areas into or around which the material of the annular element flows so that the bond between the ring and the annular element encompassing it is ensured by the form-fitting engagement and does not depend solely on a glued connection, which can come loose over time under the influence of the vibrations that the ring executes during operation.

FIGS. 5d and 5e show a second variant of the above-explained second, exemplary embodiment. All of the statements made above in connection with the second exemplary embodiment and its first modification apply to this variant, provided that nothing to the contrary is stated in the following explanation of the things that have been modified.

This second variant is distinguished by the fact that the above-described annular element, which holds the ring so that it can act as a vibration damper during operation, is embodied as an elastic, preferably flexible or rubbery-elastic form-fitting element, which in the installed state, fits snugly into a local recess, preferably on the outer circumference of the ring, and another local recess, preferably on the inner circumference of the cavity—and thus holds the ring in its proper neutral position, ideally solely by means of form-fitting and frictional engagement. Ideally, the annular element is a single cord—or at least one cord—that is closed in the circumference direction, particularly in the form of a so-called O-ring, as is commonly used in the art for sealing purposes and is therefore available "off the shelf" as an inexpensive standard element in an extremely wide variety of thicknesses, diameters, and qualities.

FIGS. 6 through 9 show a third exemplary embodiment of the invention.

The mode of operation of this third exemplary embodiment of the invention differs significantly from the first two exemplary embodiments because in this case, the vibration-reducing component 7 is embodied in a significantly different way.

The basic design of the tool chuck, which in this case as well is distinguished by the welding of a base body 2 to the sleeve part 3 or by the one-piece embodiment produced by laser sintering or the like, does, however, correspond to that of the first two exemplary embodiments and therefore statements made about them in this regard also apply here.

As shown in FIG. 6, in this exemplary embodiment as well, a cavity begins in the region of this transition between the base body 2 and the sleeve part 3; this cavity extends in the direction of the axis of rotation R to the tool holder 4 and protrudes a certain distance farther into the region of the securing flange 6, but does not reach into the coupling section 5.

In this exemplary embodiment as well, the cavity is embodied as conspicuously short in the direction of the longitudinal axis; in this case, its length $L_K$ is less than 2/5 the length $L_W$ of the tool holder; it is clear that the cavity overlaps with the tool holder 7 for a certain distance in that it extends into the vicinity of the outlet of the tool holder.

A special feature in this exemplary embodiment, which is immediately apparent in FIG. 6, is the fact that the sleeve part 3 has a first annular flange 11 and a second annular flange 12 on its end face provided for attachment to the base body 2. The first annular flange 11 is used for connecting to the base body 2, preferably by means of welding. Only this annular flange 11 is used to transmit to the base body 2 the torque that the machine tool exerts on the sleeve part 3. The second annular flange 12 is accommodated concentrically inside the first annular flange 11, but is not directly connected to the base body 2. Radial vibrations of the sleeve section 3 in the direction of the arrow RS therefore result in corresponding movements of the second annular flange 12. The vibration-reducing component 7 is fastened to the second annular flange 12.

The vibration-reducing component 7 is embodied as a separate component that is independent of the base body 2 and sleeve part 3. It is fastened to the second annular flange and, at its outer circumference, is fastened to the base body 2. In this case, the vibration-reducing component 7 influences the vibration behavior of the annular flange 12 significantly due to its mass and/or preferably also due to its intrinsically existing elasticity that produces a certain natural vibration behavior, which on the whole exerts a positive influence on the vibration behavior of the overall system.

As can be seen in the figure, the vibration-reducing component 7 in this case is embodied as a spring and is therefore intrinsically able to vibrate; it is preferably made of a spring steel. In this exemplary embodiment, the vibration-reducing component is composed of three rings 14, 15, and 16, which are flexibly connected to one another by means of bridge pieces 17. The innermost ring 14 is indirectly immobilized relative to the sleeve part 3 and the outside of the ring 16 is immobilized, preferably directly, relative to the base body. With a suitable dimensioning of the bridge pieces 17, the two latter rings 15 and 16 are able to vibrate relative to the ring 14.

In this exemplary embodiment, in order to influence the vibration behavior of the vibration-reducing component 7, it can be advantageous to fill the open spaces between the bridge pieces 17 with a vibration-damping material, for example composed of plastic.

A modification of this exemplary embodiment not shown in the figures is distinguished by the fact that the vibration-reducing component 7 in this case is not an intrinsically vibrating spring element, but rather a preferably solid ring, ideally composed of a heavy metal. To this end, the second annular flange 12 is embodied as thin-walled so that during operation, the vibration-reducing component 7 that it holds can be excited to execute vibrations—essentially in the radial direction—as a result of its spring action. It is thus possible to implement a vibration damper, which advantageously influences the vibration behavior of the sleeve part 3.

Naturally there are also mixed forms possible, where the vibration-reducing component 7 vibrates partially within itself and executes partially vibrations as a whole unit on the thin-walled, flexibly embodied second annular flange.

All of the above-explained exemplary embodiments share the fact that it can be advantageous to additionally fill the cavity with a liquid that positively influences the vibration behavior.

Figure 11:
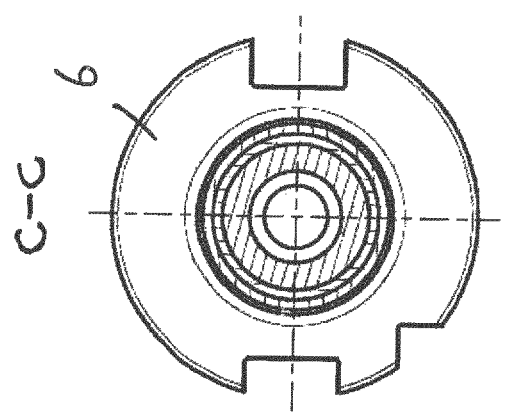
FIG. 11 shows a section through the tool chuck shown in FIG. 10 along the section line C-C.
Figure 10:
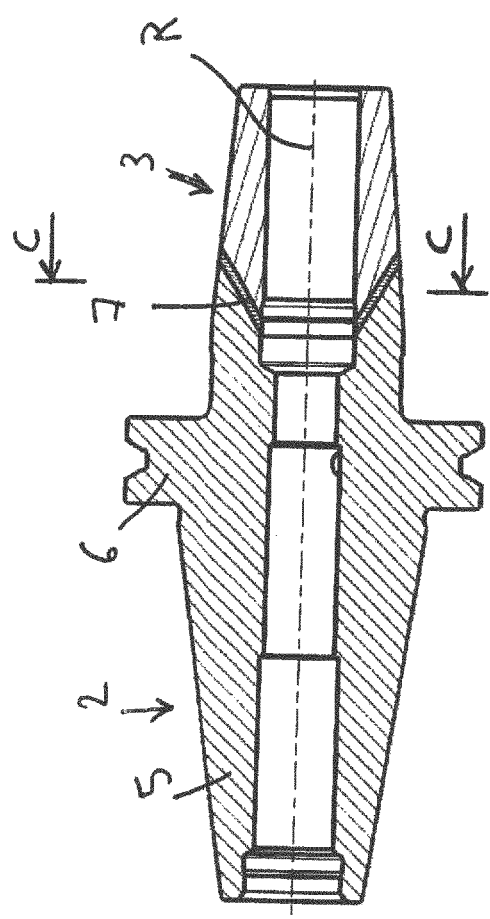
FIG. 10 shows a tool chuck of a fourth exemplary embodiment of the invention in a sectional view along the axis of rotation R.
Figure 12:
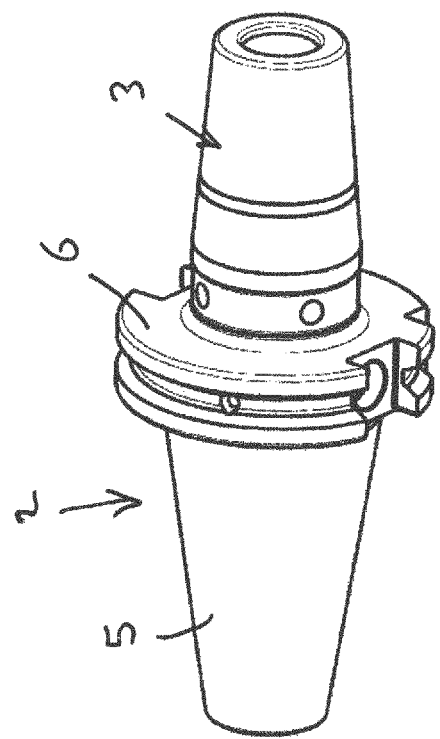
FIG. 12 shows a perspective side view of the tool chuck shown in FIGS. 10 and 11.

FIGS. 10 through 12 show a fourth exemplary embodiment of the invention.

This exemplary embodiment differs fundamentally from the exemplary embodiments described above because in this case, the vibration-reducing component is not an insert piece, but instead functions as a fastener that at least essentially lies completely within the flow of force and torque and holds the base body 2 and the sleeve element 3 together.

In connection with this exemplary embodiment, the term "component" is used loosely here because the component does not ever have to have been a separate component, but can be a layer that is used to join the base body 2 and the sleeve part 3. The vibration-reducing component 7 can, for example, be composed of a metal layer or of a correspondingly sturdy plastic layer that is used to cast, solder, or in the broadest sense, glue, the base body 2 and the sleeve part 3 to each other. If the layer is a metal layer, then it has turned out to be particularly advantageous to install a copper layer.

In any case, the thickness of the above-mentioned layer perpendicular to the surfaces that are to be joined to each other is designed so that it produces the desired damping behavior. There is no universally required formula for this, but the person skilled in the art can easily use the relevant experiments that are customary in the field to discover how thick the respective layer must be in order to demonstrate the desired damping behavior.

It is advantageous to embody the end faces of the base body 2 and the sleeve part 3, which are joined with the aid of the above-mentioned layer, as conical or circular so that the sleeve part 3 and the base body 2 are pressed into one another in a centered fashion when advancing forces or corresponding reaction forces occur, which act in the direction of the axis of rotation R of the tool chuck 1.

The surface of the end faces of the sleeve part 3 and/or the base body 2 that are to be joined with the aid of the above-mentioned layer can also advantageously be provided with undercuts or a profiling into which the material of the layer can penetrate, thus producing an anchoring through form-fitting engagement and not solely through adhesion.

In addition, for the sake of completeness, the following should be generally noted:

Protection is sought not only for the devices explained, but particularly also for methods for producing such a device.

One of these methods is distinguished by the fact that the tool chuck 1 is composed of two parts, namely a base body, which constitutes the coupling section 5 for coupling to the machine tool and constitutes the securing flange 6 for grasping and holding the chuck 1 during tool changes and a sleeve part 3, which constitutes the tool holder 4.

At least one of these parts, on its end face oriented toward the joint has a recess into which a vibration-reducing component 7 is inserted, preferably so that it is subsequently enclosed between the base body 2 and the sleeve part 3. Then the base body and the sleeve part are joined, possibly during exertion of forces in the direction of the axis, of rotation R, in order to prestress the vibration-reducing component in the manner described at the beginning.

Protection is also sought for a design that is distinguished solely by means of the following features, to which other features from the description can be optionally added:

A tool chuck 1, which is distinguished by the fact that a vibration-reducing component 7, which is preferably embodied as a separate spring element, is held inside the tool chuck and embodied so that during operation, the vibration-reducing component 7 is excited to resiliently execute intrinsic vibrations so that during operation, a part of the spring element that protrudes freely into the cavity of the tool chuck begins to vibrate relative to the part of the spring element that is fastened to the tool chuck.

Furthermore, independent protection is also claimed for the following design, whose features can be optionally supplemented with one or more features horn the description:

A tool chuck, whose interior is equipped with a vibration-reducing element in the form of a preferably metal disc or a preferably metal cylinder, which rests with its end faces directly against the corresponding end faces of the sleeve part, and base body and is preferably embodied so that it is permanently prestressed in elastic fashion between them. In a preferred modification of this, the disc or the cylinder rests against the surfaces of the sleeve part and/or the base body on all sides, without the interposition of a plastic or elastomer layer.

Independent protection is also claimed for the following design, whose features can optionally be supplemented with one or more features from the description:

A tool chuck for clamping a tool in a machine tool, having a base body 2 and a sleeve part protruding therefrom 3, which sleeve part forms a tool holder 4 for fixing a tool shaft in a frictional, nonpositive fashion; a cavity is provided in the tool chuck and accommodates a vibration-reducing liquid; preferably, the cavity begins in the vicinity of the transition from the base body 2 to the sleeve part 3, extends along the axis of rotation R in the direction toward the tool holder 4, and in the direction along the axis of rotation R, has a length $L_K$ that is less than ⅔ and preferably less than ⅕ the length $L_W$ of the tool holder 4 in this direction and ideally, the liquid is introduced into the cavity via an opening, which is then closed by a screwed-in or pressed-in or welded sealing element; a screwed-in sealing element whose screw-in depth can be used to set the pressure of the liquid in the cavity or a pressed-in sealing element whose press-in depth can be used to set the pressure of the liquid in the cavity are clearly preferable.

With regard to all of the embodiments described here, it should be noted that the cavity and the vibration-reducing component are preferably matched to each other so that the vibration-reducing component occupies the preponderance and better still, at least 70%—of the volume of the cavity. Ideally, the vibration-reducing component essentially fills the entire cavity.

The vibration-reducing component can have a preferably central through opening that preferably itself serves directly as a conduit for coolant that is supplied to the tool through the interior of the chuck.

The maximum inner radius of the cavity is preferably greater than the maximum dimension of the cavity in the direction of the axis of rotation R.

The invention claimed is:

1. A tool chuck for clamping a tool in a machine tool, tool chuck comprising:
    a base body;
    a sleeve part protruding from the base body and forming a tool holder for fixing a tool shaft in a frictional, nonpositive fashion; and
    a cavity in the tool chuck in which a vibration-reducing component is accommodated, wherein the cavity begins in a vicinity of a transition from the base body to the sleeve part, extends along an axis of rotation in a direction of the tool holder, and in the direction along the axis of rotation has, a length that is less than ⅖ a length of the tool holder in this direction, and wherein in both a radial direction and in the direction of the axis of rotation, the cavity is larger than the vibration-reducing component that the cavity accommodates;
    the vibration-reducing component rests directly on its outer circumference against an elastic layer within the cavity, and via the elastic layer the outer circumference of the vibration-reducing component indirectly contacts the inner circumference of the sleeve part and/or the base body and is held in a centered position in relation to the axis of rotation, and the elastic layer permits a movement of the vibration-reducing component in an essentially radial direction within the cavity, while end faces of the vibration-reducing component have complete freedom of motion;
    wherein the vibration-reducing component is a solid, metal, annular disc with a central opening, with a maximum dimension ($B_{max}$) of the disc parallel to an axis of rotation being less than a maximum diameter ($D_{max}$) of the disc, in accordance with the equation $B_{max}/D_{max} \leq 2$; and
    wherein the disc is made of a heavy metal, or of a material that contains a heavy metal.

2. The tool chuck according to claim 1, wherein a length of the tool holder embodied in the sleeve part makes up more than ¾ of an overall, length of the sleeve part.

3. The tool chuck according to claim 2, wherein the cavity directly adjoins a region of change in diameter at which the sleeve pan transitions into the base body or lies within this region so that the change in diameter occurs in a vicinity of a circumference wall delimiting the cavity.

4. The tool chuck according to claim 3, wherein the cavity is encompassed in a circumference direction by a joint between the base body and the sleeve part, which joint is embodied in the form of a welded seam.

5. The tool chuck according to claim 1, wherein the disc rests with a circumference surface directly against a corresponding circumference surface of the sleeve part anchor base body.

6. The tool chuck according to claim 2, wherein the disc is secured in an elastically prestressed fashion with its end faces between corresponding end faces of the sleeve part and the base body.

7. The tool chuck according to claim 1, wherein the disc rests with a circumference surface against a corresponding circumference surface of the sleeve pan and/or the base body via an intermediate layer composed of plastic and/or elastomer so that with proper operation, the disc is able to execute relative movements in a radial direction in relation to the sleeve part and the base body, and the end faces of the disc contact the corresponding end faces of the sleeve part and base body only in such a way that the disc is not immobilized by friction occurring there.

8. The tool chuck according to claim 1, wherein the vibration-reducing component is a spring element that is secured inside the tool chuck and is embodied in such a way that the spring element is excited to execute intrinsic vibrations during operation so that during operation, a part of the spring element that protrudes freely into the cavity of the tool chuck begins to vibrate relative to a part of the spring element that is fastened to the tool chuck.

9. The tool chuck according to claim 8, wherein the sleeve part, on its end face oriented toward the base body, has a first annular flange for connection to the base body and a second flange, which is situated concentrically inside the first annular flange and, even in an installed state, does not directly contact the base body, against which second flange the spring element rests, while a section of the spring element that is oriented away from a fastening point protrudes into the cavity in a way that allows the section of the spring element to vibrate freely.

10. The tool chuck according to claim 8, wherein the spring element is composed of at least two rings situated one inside the other, which are connected to one another by bridge pieces.

11. The tool chuck according to claim 1, wherein the base body and the sleeve pan are separate components that are joined to each other in a frictional, nonpositive fashion not directly, but with an interposition of a damping material layer, and a wedge-shaped or conical gap is situated between the sleeve part and the base body and is filled with the layer of damping material.

12. A tool chuck for clamping a tool in a machine tool, wherein the tool rotates around an axis of rotation during operation, the tool chuck comprising:
    a base body; and
    a sleeve part with an inner opening extending in a direction of the axis of rotation, the sleeve part protruding from the base body and forming a tool holder for fixing a tool shaft in the inner opening in a frictional, nonpositive fashion;
    wherein the base body and the sleeve pan are separate components that are joined to each other in a frictional, nonpositive fashion not directly, but with an interposition of a damping material layer resulting in vibrations of the sleeve part being transmitted not unhindered to a spindle of the machine tool, and a conical gap is situated between the sleeve part and the base body and is filled with the layer of damping material, which allows the sleeve part and the base body to be pressed into each other in a centering fashion by compressive forces acting in a direction of the axis of rotation.

13. A tool chuck for clamping a tool in a machine tool, the tool chuck comprising:
    a base body; and
    a sleeve part protruding from the base body and forming a tool holder for fixing a tool shaft in a frictional, nonpositive fashion;
    wherein the base body and the sleeve part are separate components that are joined to each other in a frictional, nonpositive fashion, not directly, but with an interposition of a damping material layer resulting in vibrations of the sleeve part being transmitted not unhindered to a spindle of the machine tool, and a conical gap is situated between the sleeve part and the base body and is filled with the layer of damping material, which allows the sleeve part and the base body to be pressed into each other in a centering fashion by compressive forces acting in a direction of an axis of rotation; and wherein end faces of the sleeve part and/or the base body that form the Rap have undercuts into which the damping material layer penetrates and produces a form-fitting engagement.

\* \* \* \* \*

UNITED STATES PATENT AND TRADEMARK OFFICE
CERTIFICATE OF CORRECTION

PATENT NO. : 10,618,117 B2
APPLICATION NO. : 15/826570
DATED : April 14, 2020
INVENTOR(S) : Franz Haimer Page 1 of 1

It is certified that error appears in the above-identified patent and that said Letters Patent is hereby corrected as shown below:

In the Claims

Column 13, Line 13, of Claim 1, "tool, tool" should read --tool, the tool--.

Column 13, Line 24, of Claim 1, "has, a" should read --has a--.

Column 13, Line 50, of Claim 2, "overall, length" should read --overall length--.

Column 13, Line 51, of Claim 3, "claim 2" should read --claim 1--.

Column 13, Line 53, of Claim 3, "pan" should read --part--.

Column 13, Line 62, of Claim 5, "anchor" should read --and/or--.

Column 13, Line 64, of Claim 6, "claim 2" should read --claim 1--.

Column 14, Line 34, of Claim 11, "pan" should read --part--.

Column 15, Line 11, of Claim 13, "Rap" should read --gap--.

Signed and Sealed this
Eighth Day of September, 2020

Andrei Iancu
*Director of the United States Patent and Trademark Office*